Dec. 15, 1925.　　　　　　　　　　1,565,425
H. DAVIES ET AL
DETINNING OF TINNED IRON SCRAP
Filed June 28, 1923
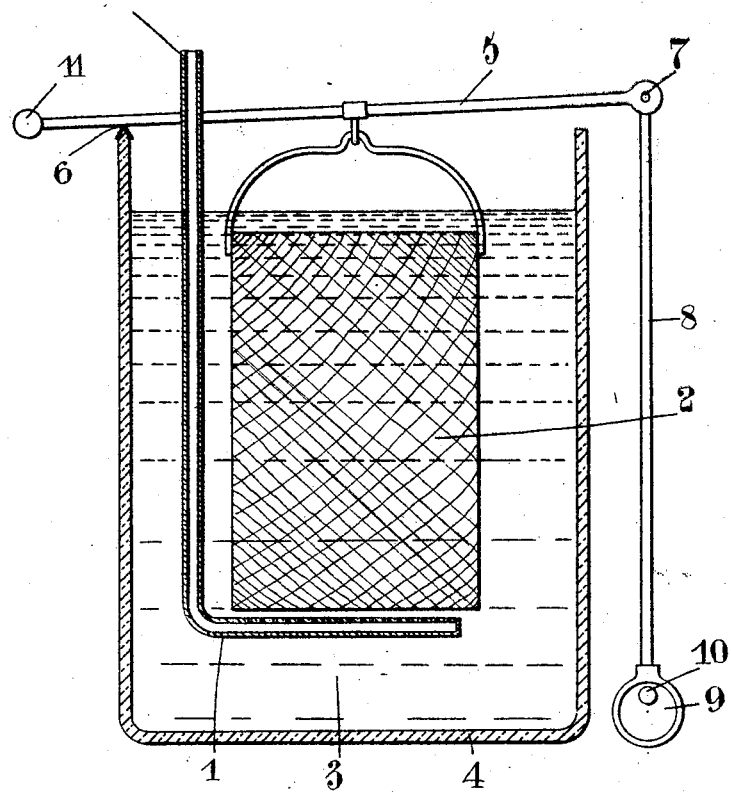
Inventors
H. Davies
M. A. Adam
By Marks & Clerk Attys Patented Dec. 15, 1925.

1,565,425

UNITED STATES PATENT OFFICE.

HAROLD DAVIES AND MATTHEW ATKINSON ADAM, OF LONDON, ENGLAND; SAID DAVIES ASSIGNOR TO SAID ADAM.

DETINNING OF TINNED-IRON SCRAP.

Application filed June 28, 1923. Serial No. 648,343.

*To all whom it may concern:*

Be it known that we, HAROLD DAVIES, a subject of the King of Great Britain and Ireland, and residing at 6 Featherstone Buildings, High Holborn, London, W. C. 1, England, and MATTHEW ATKINSON ADAM, a subject of the King of Great Britain and Ireland, and residing at 57 and 58 Lincoln's Inn Fields, London, W. C. 2, England, have invented certain new and useful Improvements Relating to the Detinning of Tinned-Iron Scrap, of which the following is a specification.

This invention relates to the detinning of tinned iron scrap by the process described in United States Patent No. 1,379,237 dated the 24th day of May, 1921, and has for its principal object the reduction of the time taken to strip the tin scrap, and thus improve the economy of the plant by increasing its output in a given time.

The invention consists in absorbing chlorine in the stripping solution which is substantially saturated with iron and tin chlorides, and in effecting the absorption in the stripping vats.

In carrying this invention into effect in one form by way of example, as illustrated in the accompanying diagrammatic drawing, we provide a regulated chlorine not shown supply from a cylinder of liquid chlorine by way of a suitable perforated pipe 1, e. g., of earthenware, arranged under the bale of scrap 2, which is suspended in the detinning liquid 3 in the acid proof vessel 4. The chlorine is rapidly absorbed and the absorption is facilitated by the agitation of the liquid which takes place mechanically. This agitation is accomplished in the following manner. The bale of scrap 2 is suspended from the middle of a lever 5 which is capable of being rocked about the edge 6 of the vessel 4.

The end 7 of the lever 5 is raised and lowered successively by the rod 8 which is attached to an eccentric strap 9 on a revolving shaft 10.

A handle 11 is provided to facilitate removal and insertion of the bales of scrap, using the point 7 as a fulcrum for the lever 5. The chlorine acts partly directly on the scrap and partly by increasing the proportion of stannic chloride present. By suitable regulation of the chlorine supply any concentration of stannic chloride desired can be maintained. It is also practicable to work with varying concentration of stannic chloride. The detinning solution preferably contains a small proportion of hydrochloric acid which is replenished as required.

A suitable acidity is such that 100 cc. of solution requires, in order to produce a permanent precipitate, 15 cc. of normal sodium hydroxide per gram of stannic tin contained in the solution. This degree of acidity is conveniently designated "15 per cent normal."

By varying the supply of chlorine, the proportion or concentration of stannic chloride in the solution may be increased or decreased within wide limits; for example, if an analysis shows that the concentration of stannic chloride is becomming too high, then the operation of detinning may be continued while decreasing or even stopping the current of chlorine altogether. If desired, from time to time a proportion of the solution may be replaced by water, thus maintaining the concentration of tin in the solution at any desired figure. It is preferable, however, to work as first described above, in order to maintain the solution approximately constant for removal of the tin by electrolysis when this is done.

Having now described our invention, what we claim as new and desire to secure by Letters Patent is:—

A process of treating tinned iron scrap which consists in immersing the scrap in a solution substantially saturated with iron and tin chlorides in a stripping vessel and injecting a regulable quantity of chlorine gas into the liquid in said vessel in order to regulate the solvent properties of said liquid.

In testimony whereof we have signed our names to this specification.

HAROLD DAVIES.
MATTHEW ATKINSON ADAM.